US010026311B2

(12) United States Patent
Zhdanov et al.

(10) Patent No.: US 10,026,311 B2
(45) Date of Patent: Jul. 17, 2018

(54) METHOD AND APPARATUS FOR DETERMINING DIRECTION OF THE BEGINNING OF VEHICLE MOVEMENT

(71) Applicant: Topcon Positioning Systems, Inc., Livermore, CA (US)

(72) Inventors: Alexey V. Zhdanov, Moscow (RU); Eugene I. Zintsov, Moscow (RU)

(73) Assignee: Topcon Positioning Sytems, Inc., Livermore, CA (US)

( * ) Notice: Subject to any disclaimer, the term of this patent is extended or adjusted under 35 U.S.C. 154(b) by 0 days.

(21) Appl. No.: 15/335,017

(22) Filed: Oct. 26, 2016

(65) Prior Publication Data

US 2017/0046953 A1    Feb. 16, 2017

Related U.S. Application Data

(63) Continuation of application No. 13/203,951, filed as application No. PCT/RU2010/000622 on Oct. 26, 2010, now Pat. No. 9,534,898.

(30) Foreign Application Priority Data

Jun. 16, 2010   (RU) ................................ 2010124265

(51) Int. Cl.
   *G08G 1/056*       (2006.01)
   *G01C 21/08*       (2006.01)

(52) U.S. Cl.
   CPC ............. *G08G 1/056* (2013.01); *G01C 21/08* (2013.01)

(58) Field of Classification Search
   CPC ............ A01B 69/008; B60W 2520/06; B60W 2520/402; B60W 40/10; F16H 2059/443;

(Continued)

(56) References Cited

U.S. PATENT DOCUMENTS 4,644,358 A * 2/1987 Sekine ................. G01S 19/53
                                                           342/356
5,058,023 A * 10/1991 Kozikaro ............... G01C 21/28
                                                           33/356

(Continued)

FOREIGN PATENT DOCUMENTS

WO        2009046763 A1    4/2009

OTHER PUBLICATIONS

International Search Report and Written Opinion dated Feb. 10, 2011, in connection with International Patent Application No. PCT/RU2010/000622, 12 pgs.

*Primary Examiner* — Courtney D Heinle
(74) *Attorney, Agent, or Firm* — Chiesa Shahinian & Giantomasi PC

(57) ABSTRACT

A method of movement mode determination comprising measurement of vehicle's position and orientation and calculation of movement parameters, a compass on the vehicle, is azimuthally oriented along the prevailing and is mostly used movement direction ("forward" direction), a movement vector measurement unit, is used for measuring the azimuth of movement vector. A calculation unit being used for measuring an angle between vehicle movement vector azimuth measured by the movement vector measurement unit and vehicle azimuth measured by the compass fixed on the vehicle; movement is regarded as "backward" if the calculated angle is greater than 90 degrees, and "forward" if the calculated angle is smaller than 90 degrees. Also, an apparatus for movement direction determination includes a compass and a computation unit and further comprises a movement vector measurement unit for determining vehicle movement azimuth and connected through a signal connection to the computation unit.

21 Claims, 14 Drawing Sheets

(58) Field of Classification Search
CPC .......... G01C 7/04; G01C 21/08; G01C 23/00; G01C 22/00; G01C 17/10–17/16; G01C 21/10
USPC .............. 701/467, 492, 493, 514, 516, 517, 701/519–526, 117, 23, 489, 223, 225, 701/408; 356/3
See application file for complete search history.

(56) References Cited

U.S. PATENT DOCUMENTS

| | | | |
|---|---|---|---|
| 5,101,356 A * | 3/1992 | Timothy | G01S 19/54 342/352 |
| 5,267,014 A * | 11/1993 | Prenninger | G05B 19/18 348/135 |
| 5,323,321 A * | 6/1994 | Smith, Jr. | G01C 21/3632 340/990 |
| 5,337,243 A * | 8/1994 | Shibata | G06G 7/78 342/357.57 |
| 5,390,122 A | 2/1995 | Michaels et al. | |
| 5,390,125 A * | 2/1995 | Sennott | B60K 31/0008 342/357.24 |
| 5,877,723 A * | 3/1999 | Fan | G01S 19/49 342/357.31 |
| 5,887,269 A * | 3/1999 | Brunts | G01S 19/14 340/990 |
| 5,928,309 A * | 7/1999 | Korver | G01C 21/165 342/359 |
| 5,995,895 A * | 11/1999 | Watt | A01B 79/005 701/50 |
| 6,223,105 B1 * | 4/2001 | Teague | G01C 21/165 244/164 |
| 6,255,793 B1 * | 7/2001 | Peless | A01D 34/008 180/168 |
| 6,282,496 B1 * | 8/2001 | Chowdhary | G01C 21/165 342/357.31 |
| 6,366,856 B1 * | 4/2002 | Johnson | G01C 17/28 701/454 |
| 6,836,725 B2 * | 12/2004 | Millington | G01C 21/20 701/454 |
| 6,847,436 B2 * | 1/2005 | Bridges | G01S 7/4811 356/4.02 |
| 6,859,729 B2 | 2/2005 | Breakfield et al. | |
| 6,956,525 B1 * | 10/2005 | Chang | G01C 17/38 342/357.36 |
| 7,321,824 B1 * | 1/2008 | Nesbitt | G01C 21/367 340/955 |
| 7,451,029 B2 | 11/2008 | McLaren et al. | |
| 8,027,761 B1 * | 9/2011 | Nelson | A01D 34/008 180/168 |
| 8,320,616 B2 * | 11/2012 | Kaiser | G01C 21/005 340/988 |
| 8,346,466 B2 * | 1/2013 | Chueh | G01C 21/12 701/472 |
| 8,558,992 B2 * | 10/2013 | Steffey | G01C 15/002 356/3.01 |
| 2002/0015521 A1 * | 2/2002 | Kim | G06K 9/00664 382/153 |
| 2002/0128775 A1 * | 9/2002 | Brodie | G01C 21/165 701/472 |
| 2003/0006048 A1 * | 1/2003 | Marriott, Jr. | E02F 3/76 172/4.5 |
| 2003/0043362 A1 * | 3/2003 | Lau | G01C 15/00 356/4.09 |
| 2003/0187560 A1 * | 10/2003 | Keller | A01B 79/005 701/50 |
| 2004/0059471 A1 * | 3/2004 | Harvey | B60R 25/04 701/1 |
| 2004/0167714 A1 * | 8/2004 | Macphail | G01C 21/20 701/469 |
| 2005/0033507 A1 * | 2/2005 | Fukui | G01C 21/3632 701/445 |
| 2005/0183275 A1 * | 8/2005 | Kwon | G01C 17/30 33/361 |
| 2006/0122754 A1 * | 6/2006 | McLaren | A01B 69/008 701/51 |
| 2007/0016386 A1 * | 1/2007 | Husted | G01C 17/00 702/150 |
| 2007/0118263 A1 * | 5/2007 | Nelson | A01B 69/008 701/41 |
| 2008/0004808 A1 * | 1/2008 | Johnson | G01C 15/002 702/1 |
| 2008/0040029 A1 | 2/2008 | Breed | |
| 2008/0218728 A1 * | 9/2008 | Kirschner | G01C 15/00 356/4.01 |
| 2008/0316497 A1 * | 12/2008 | Taketomi | G01C 15/002 356/498 |
| 2009/0063051 A1 * | 3/2009 | Watanabe | G01C 21/165 701/472 |
| 2009/0164067 A1 * | 6/2009 | Whitehead | A01B 79/005 701/41 |
| 2009/0231582 A1 * | 9/2009 | Aebischer | G01C 15/002 356/364 |
| 2009/0240372 A1 * | 9/2009 | Bordyn | B25J 9/1692 700/259 |
| 2009/0326740 A1 * | 12/2009 | Wang | G01C 23/00 701/3 |
| 2010/0023185 A1 * | 1/2010 | Terwelp | G01S 17/023 701/2 |
| 2010/0032492 A1 * | 2/2010 | Grimm | A01M 7/0089 239/1 |
| 2010/0149525 A1 * | 6/2010 | Lau | G01B 11/002 356/139.03 |
| 2010/0152973 A1 * | 6/2010 | Chung | B60T 8/1755 701/42 |
| 2010/0176270 A1 * | 7/2010 | Lau | B25J 9/1692 250/203.2 |
| 2010/0214164 A1 * | 8/2010 | Nardi | B60T 8/172 342/357.23 |
| 2010/0318255 A1 * | 12/2010 | Li | B60T 8/172 701/31.4 |
| 2011/0069322 A1 * | 3/2011 | Hoffer, Jr. | G01B 11/002 356/615 |
| 2011/0080306 A1 * | 4/2011 | Leopold | G01P 3/38 340/935 |
| 2011/0082642 A1 * | 4/2011 | Magnussen | G01C 21/30 701/532 |
| 2011/0083917 A1 * | 4/2011 | Badreddine | B60K 6/448 180/65.23 |
| 2011/0125404 A1 * | 5/2011 | Czompo | G01C 21/165 701/472 |
| 2011/0156957 A1 * | 6/2011 | Waite | G01S 5/0221 342/450 |
| 2011/0187582 A1 * | 8/2011 | Tsunekawa | G08G 1/166 342/107 |
| 2011/0250931 A1 * | 10/2011 | Pande | G01C 21/165 455/566 |
| 2012/0124850 A1 * | 5/2012 | Ortleb | G01C 15/06 33/228 |
| 2012/0173195 A1 * | 7/2012 | Opshaug | G01C 21/165 702/151 |
| 2012/0249343 A1 | 10/2012 | Thomas | |
| 2012/0287280 A1 * | 11/2012 | Essati | G01C 21/005 348/148 |
| 2012/0303176 A1 * | 11/2012 | Wong | G01S 17/023 701/1 |
| 2012/0326923 A1 * | 12/2012 | Oehler | G01S 5/0284 342/357.29 |
| 2013/0211716 A1 * | 8/2013 | Kellar | G01C 21/165 701/472 |
| 2014/0005928 A1 * | 1/2014 | Giannetta | G01S 19/49 701/431 |
| 2015/0066240 A1 * | 3/2015 | Das Adhikary | G01C 21/12 701/1 |

* cited by examiner

METHOD AND APPARATUS FOR DETERMINING DIRECTION OF THE BEGINNING OF VEHICLE MOVEMENT

CROSS-REFERENCE TO RELATED APPLICATIONS

This application is a Continuation of U.S. application Ser. No. 13/203,951, filed Aug. 30, 2011 which was a National Phase of PCT/RU2010/000622, filed on Oct. 26, 2010, which claims priority to Russian Patent Application No. 2010124265 filed on Jun. 16, 2010, all of which are incorporated by reference herein in their entirety.

FIELD OF THE INVENTION

The present invention relates to tracking and controlling moving objects, and to determining direction of movement of a vehicle.

BACKGROUND OF THE INVENTION

In the process of controlling a moving object, initial direction of the moving object relative to the prevailing direction should first be fixed. For many tasks relating to vehicle transportation management, it is sufficient to determine just a direction in which a vehicle starts to move—"forward" or "backward" relative to the prevailing movement direction, which is mostly used for the given vehicle considering its design and/or its operational specifics.

For example, a four-wheel vehicle, which turns by rotating one wheel pair, has a prevailing moving direction (the most likely used) which passes through the center of the second wheel pair towards the center of the first (steering) wheel pair.

If an object, such as a four-wheel tractor, moves forward and needs to turn right, the steering system turns the wheels to a positive angle (to the right); if the tractor moves backward (uses a reverse gear) and needs to turn to the right relative to the current moving direction, then the wheels should be turned to a negative angle (to the left), and some auxiliary elements (swiveling mirrors, reversing camera, parktronic, audible warning etc) should be used.

A method of vehicle moving direction estimation using transmission control information according to U.S. Pat. No. 7,451,029 is implemented by mechanical connection of a device detecting the vehicle's movement to a transmission controller or vehicle wheels.

The drawback of this method is the necessity of the mechanical connection between a special detector with engine transmission or vehicle's wheels, as well as a possible mismatch in the direction of wheel rotation and real vehicle movement, for example, due to wheel slip or frictional sliding.

An orientation measurement apparatus and method according to U.S. Pat. No. 4,644,358 is implemented by the use of a set of rotating antennas receiving Global Navigation Satellite System (GNSS) signals.

The drawback of this method is the necessity of using a complex rotating antenna and a separate computing device, as well as high sensitivity to measurement errors and interference.

As an alternative, an accelerometer (e.g., a one-axis accelerometer, or a three-axis accelerometer, or a MEMS-type accelerometer) can be used, although the accuracy of most accelerometers is only good for rapidly accelerating vehicles, and often relatively poor for slowly moving vehicles. Most commercial accelerometers have relatively high errors in accuracy. Highly accurate accelerometers are often expensive, and not always available for non-military applications.

As another alternative, an inertial measurement unit (e.g., 6 degrees of freedom IMU, consisting of three accelerometers and three gyroscopes) can be used, but usually robustness/reliability of direction detection for slowly moving vehicles is not enough.

Sensitive axis of accelerometer should be placed along longitudinal axis of machine and pointed, e.g., in a forward direction. In the ideal case, when the vehicle starts to move forward, the accelerometer will output positive value. When backward—the accelerometer will output a negative value. The sign of the measured acceleration can be used for direction detection. However, a typical vehicle moving, e.g., forward usually has unstable acceleration, which has both positive and negative pulses that do not allow to properly detect direction. On the other hand, an accelerometer installed on the vehicle with a suspension system may be affected by pitching/rocking caused by a moment of inertia, which leads again to unstable fluctuating acceleration.

Moreover, the accelerometer itself has two types of errors: one changes fast and is called "noise", the other changes slowly and is called "bias". These issues do not allow to properly recognize actual movement, and usually an approach of combining accelerometer with GNSS receiver measurement is used.

Integrating techniques are usually based on Kalman filtering, which is well known approach in the art. Kalman filter (KF) allows to process different type of measurements simultaneously, taking into account their inherent errors and estimate parameter of movement such as position, velocity and acceleration. To properly work, the filter should align GNSS coordinate system and inertial coordinate system, i.e., the system used by the accelerometer. As long as the direction is not resolved, there can be two hypotheses: forward and backward movement. The best parameter to check the hypothesis is velocity. FIG. 11 shows velocity measured by GNSS and estimated by KF for a fast moving object in case of true hypothesis about movement direction. Maximum velocity about 7 m/s or 25 km/h. One can see in such case difference between measured and estimated values has behavior of noise which do not exceed 0.5 m/s threshold. FIG. 12 shows case of wrong hypothesis for the same movement scenario. One can see here that the difference has a large spiked behavior which exceed 0.5 m/s. Comparison of difference with threshold can be used as a criteria for direction detection. FIG. 13 shows a case of a slowly moving object with velocity 0.6 m/s or 2 km/h. There in case of true hypothesis difference is within threshold of 0.5 m/s. However in case of wrong hypotheses (see FIG. 14), the difference is again within thresholds. So, the direction detection based on the accelerometer does not work for the case of slowly movement object.

Also, because of its construction, the accelerometer does not detect pure acceleration but also Earth's gravity. Therefore, moving on an uneven surface or just changing of pitch of the moving object will add a projection of gravity vector to acceleration measurement and will need separate pitch or gravity vector measurement to calculate acceleration from accelerometer measurements.

Thus, the objective is finding approach that allows to properly detect direction independent of object structure and dynamics of object movement.

SUMMARY OF THE INVENTION

The proposed method implements determination of the movement mode (how a vehicle moves—forwards or backwards relative to the prevailing and most used movement direction) by comparing the vector azimuth of vehicle movement gained from a global positioning device, for example, a specific GNSS receiver, and the azimuth taken from a compass which is fixed on a moving vehicle.

To determine a movement mode, a local geodetic coordinate system NED (North-East-Down) is used. It is a three dimensional Cartesian coordinate system, the axes of which are directed to the North, to the East and down (perpendicular to the first two axes, forming a correct right reference frame).

The global positioning device measures a vehicle movement vector in NED coordinates, the coordinate center corresponds the position of the moving vehicle at the measurement instant.

An apparatus, as shown in FIG. 10, to implement this method includes:
- a unit to measure movement vector;
- a unit to measure the azimuth (compass);
- a computing unit with signal connection to the movement measuring unit and compass.

The movement vector measuring unit, shown in FIG. 10, can be implemented in the form of a global positioning device fixed onto the vehicle.

An embodiment of this movement vector measuring unit can be a device shown in FIG. 6, comprising a set of external (i.e., relative to the vehicle) check-point-to-vehicle-measuring unit (range sensor), and marker angular position unit (angle meter).

The proposed method is implemented as illustrated in FIG. 7.

A compass is fixed at a vehicle and oriented in the azimuth along the prevailing and most used moving direction ("forward" direction). FIG. 10 shows that the compass within the apparatus enclosure is fixed on the car and oriented along the prevailing moving direction of the car. In FIG. 6, the compass is fixed on the car separately and oriented along the prevailing moving direction of the car.

Movement vector azimuth is measured by the movement vector measuring unit, while the azimuth (i.e., azimuth orientation of the vehicle) is determined by the compass.

If the movement vector is calculated based on two consistent position determinations, the azimuth from the compass is taken at each measurement and later averaged.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

Figure 11:
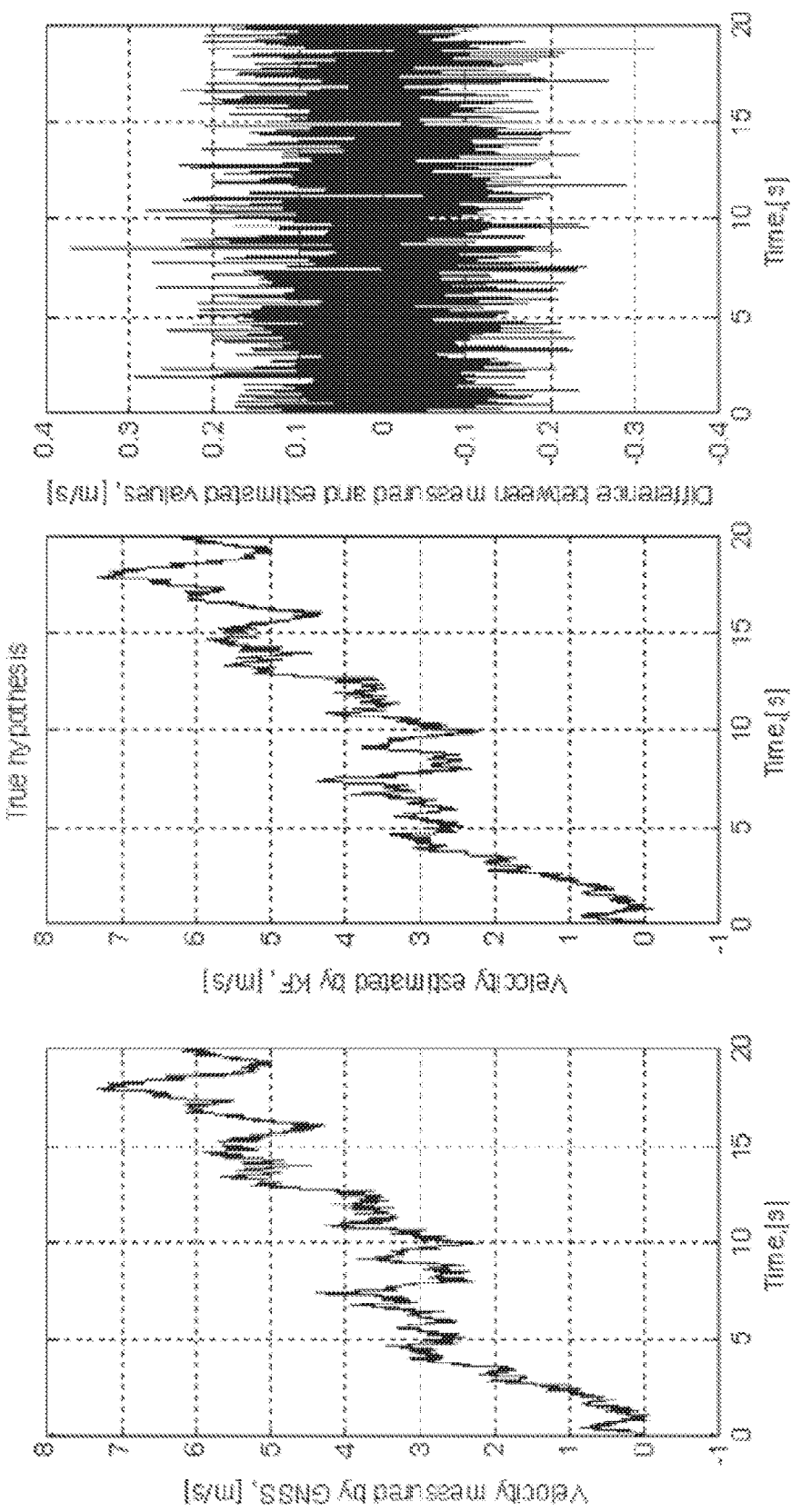
Figure 12:
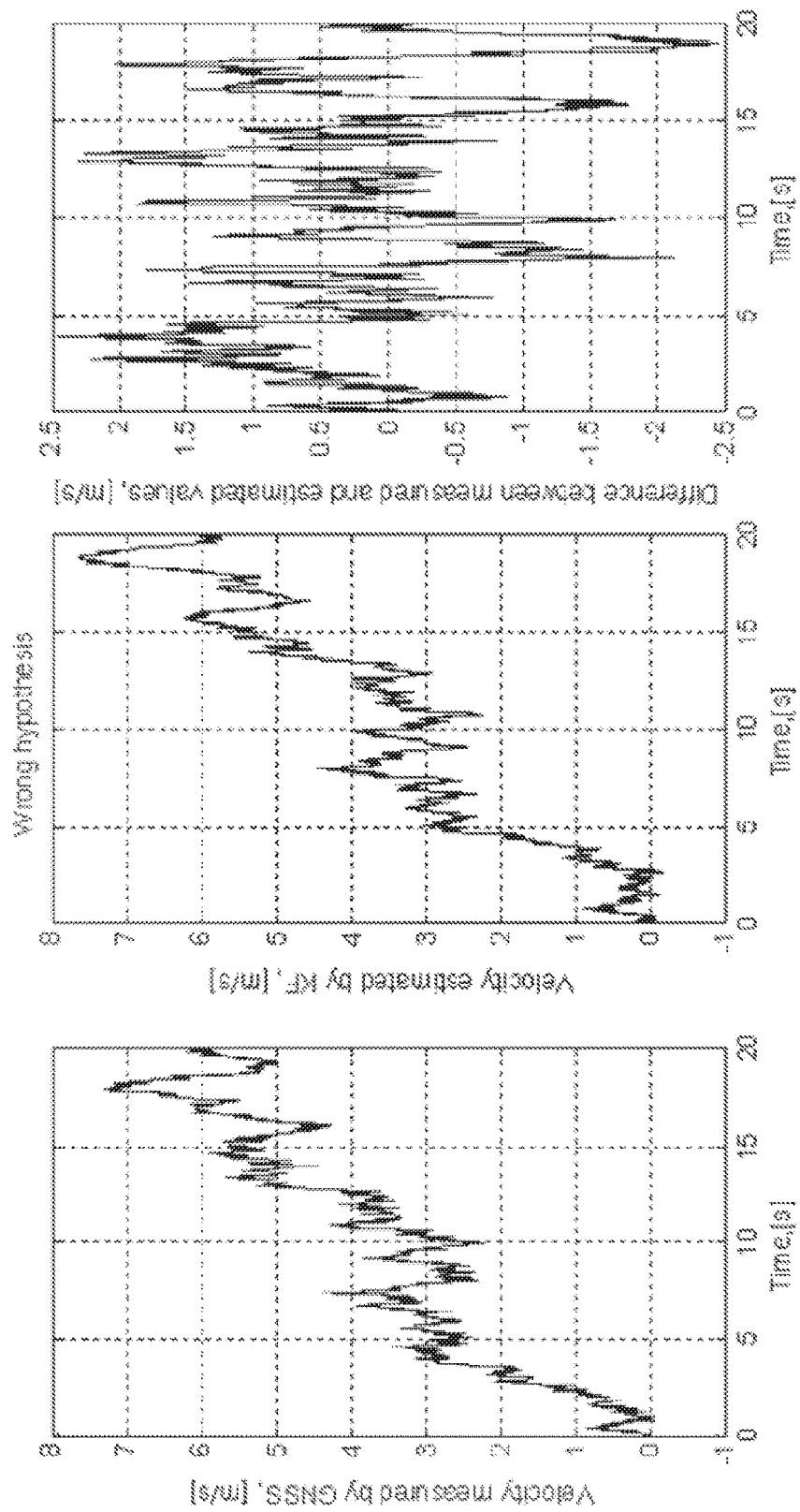
Figure 13:
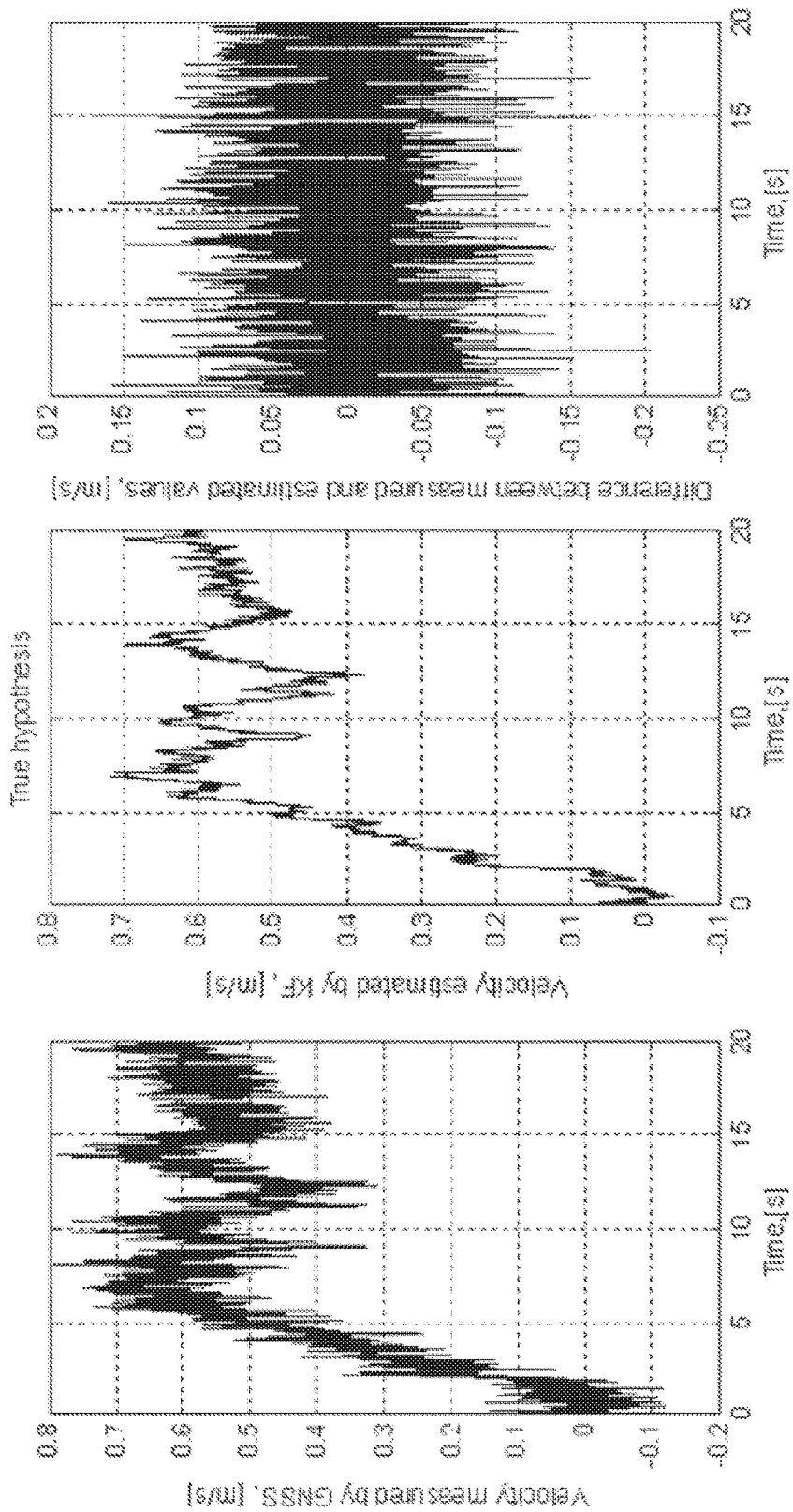
Figure 14:
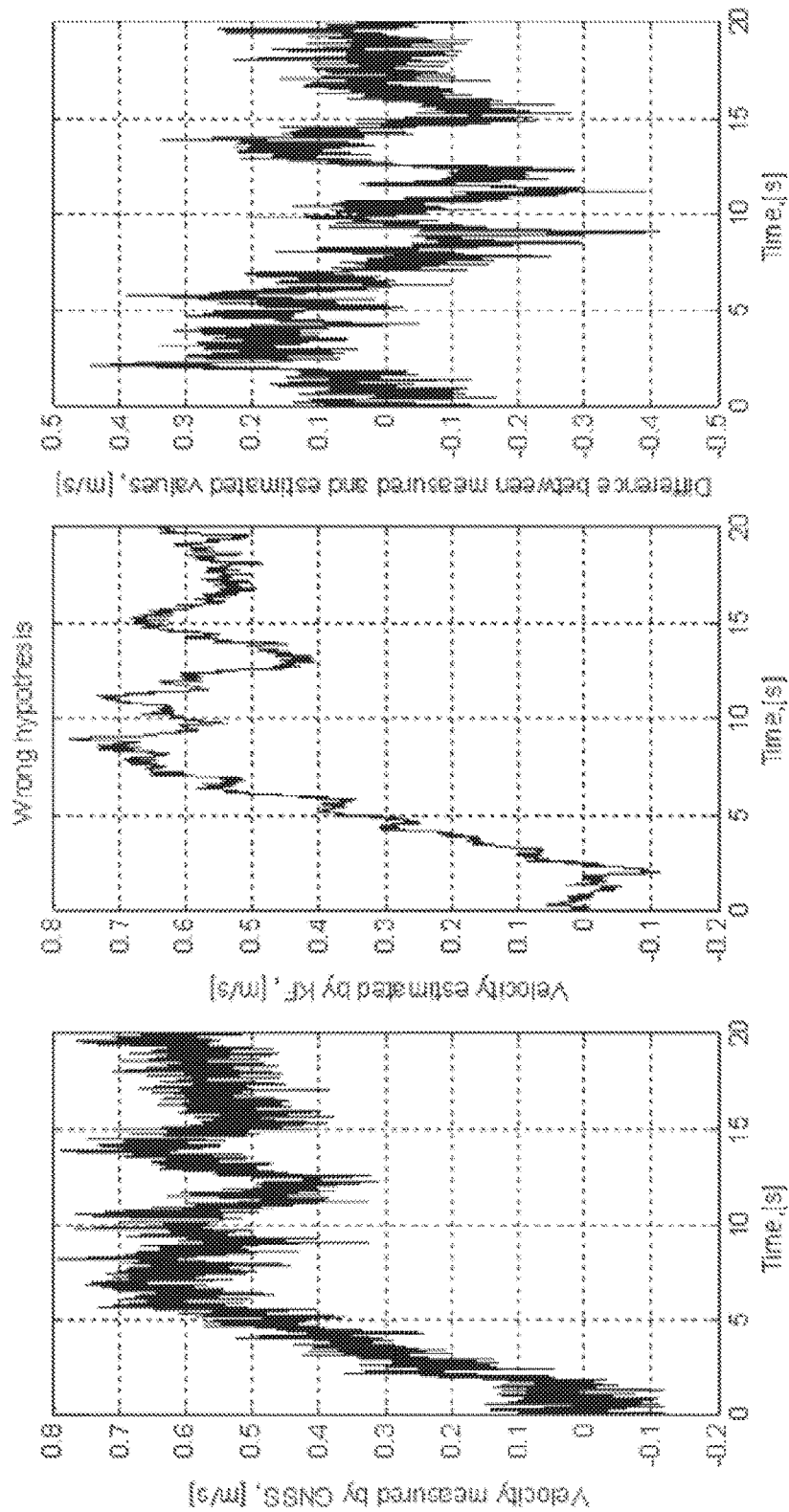

FIG. 11 shows a graph of movement parameters for true hypothesis about movement direction of fast moving objects FIG. 12 shows graph of movement parameters for false hypothesis about movement direction of fast moving objects FIG. 13 shows graph of movement parameters for true hypothesis about movement direction of slow moving objects FIG. 14 shows graph of movement parameters for false hypothesis about movement direction of slow moving objects

DETAILED DESCRIPTION OF THE PREFERRED EMBODIMENTS

Reference will now be made in detail to the preferred embodiments of the present invention, examples of which are illustrated in the accompanying drawings.

The proposed method and apparatus serve for determination of the movement mode (how a vehicle moves—forwards or backwards relative to the prevailing and most used movement direction).

For movement determination the proposed apparatus is used, which includes following unit:
- A) Vehicle movement measurement unit
- B) Compass unit
- C) Computation unit A vehicle movement measurement can be implemented as a unit able to provide a set of measurements which are possible to convert into vehicle movement vector or vehicle movement azimuth in local geodetic coordinate system. For definiteness NED geodetic coordinate system will be used. NED is a Cartesian coordinate system with a local coordinate center close to vehicle location, in range of few hundreds kilometers, for example, and axes directed to North, East and Down correspondingly. The different vehicle movement vector measurement unit implementations will be described below.

Figure 1:
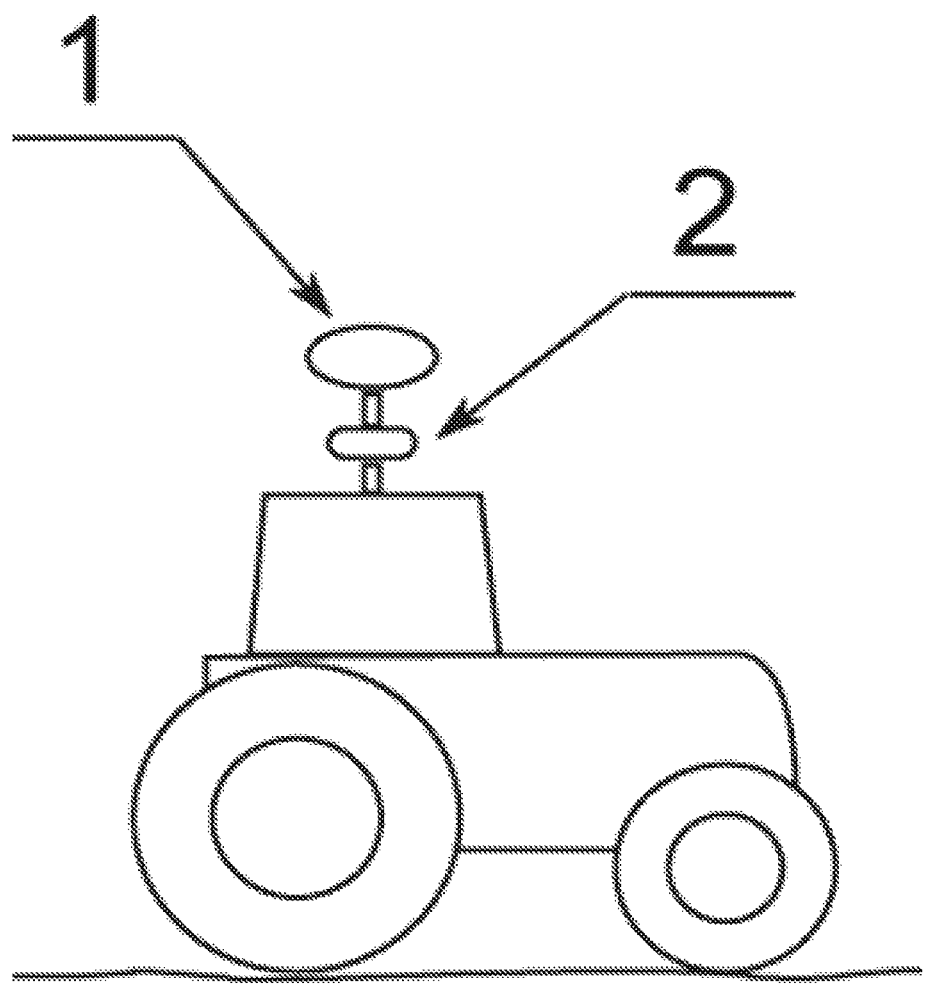
FIG. 1 shows an apparatus mounted on tractor.
Figure 2:
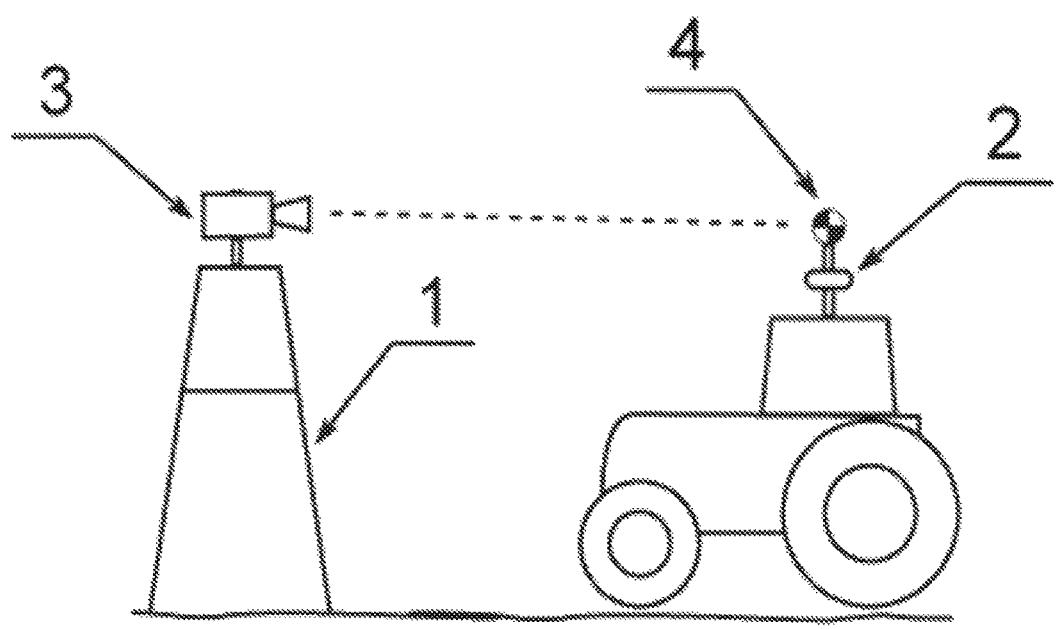
FIG. 2 shows an apparatus which includes a compass (2) fixed onto a vehicle and a device (3) combining a range finder (for example, a laser range finder) measuring distance to the marker, and an angle meter measuring angular position of the marker (4).

A compass unit should be fixed onto a vehicle as shown in FIG. 1 (compass (2)) and oriented in the azimuth along the prevailing and mostly-used movement direction ("forward" direction). The apparatus includes a global navigation receiver (1), the compass (2) and a computation unit (not shown) mounted on a vehicle. FIG. 2 shows an apparatus which includes a compass (2) fixed onto a vehicle and a device (3) combining a range finder (for example, a laser range finder) measuring distance to the marker (4), and an angle meter measuring angular position of the marker (4). Sensors (except the compass) are located outside the vehicle (computation unit is not shown) are mounted on not moving tripod (1). In addition, FIG. 2 shows an embodiment of the marker (4) fixed onto the vehicle.

Figure 3:
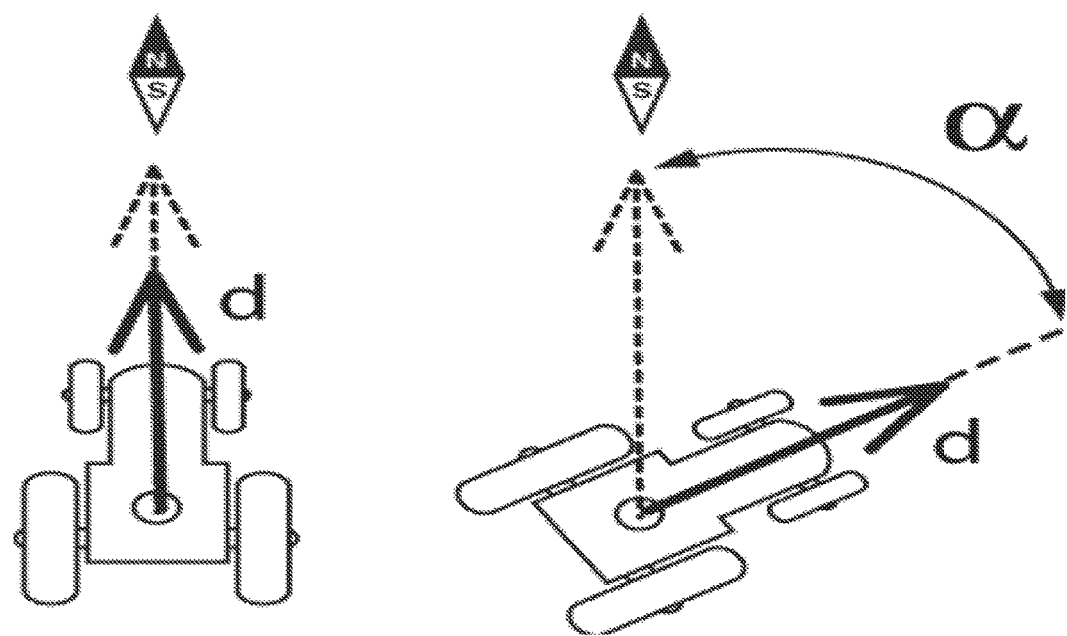
FIG. 3 shows a method of measuring azimuth angle ($\alpha$) of the vehicle's prevailing movement direction (d) by a compass fixedly mounted onto the vehicle.

FIG. 3 shows a method of measuring azimuth angle (α) of the vehicle's prevailing movement direction (d) by a compass fixedly mounted onto the vehicle. On the left side of FIG. 3 there is a case shown when prevailing movement direction (d) oriented to North which means the azimuth of prevailing movement direction (d) equals zero. The right side of FIG. 3 shows an example for a prevailing movement direction (d) that is rotated with respect to North by angle (α) clockwise, which means the azimuth of prevailing movement direction (d) equals α.

Figure 4:
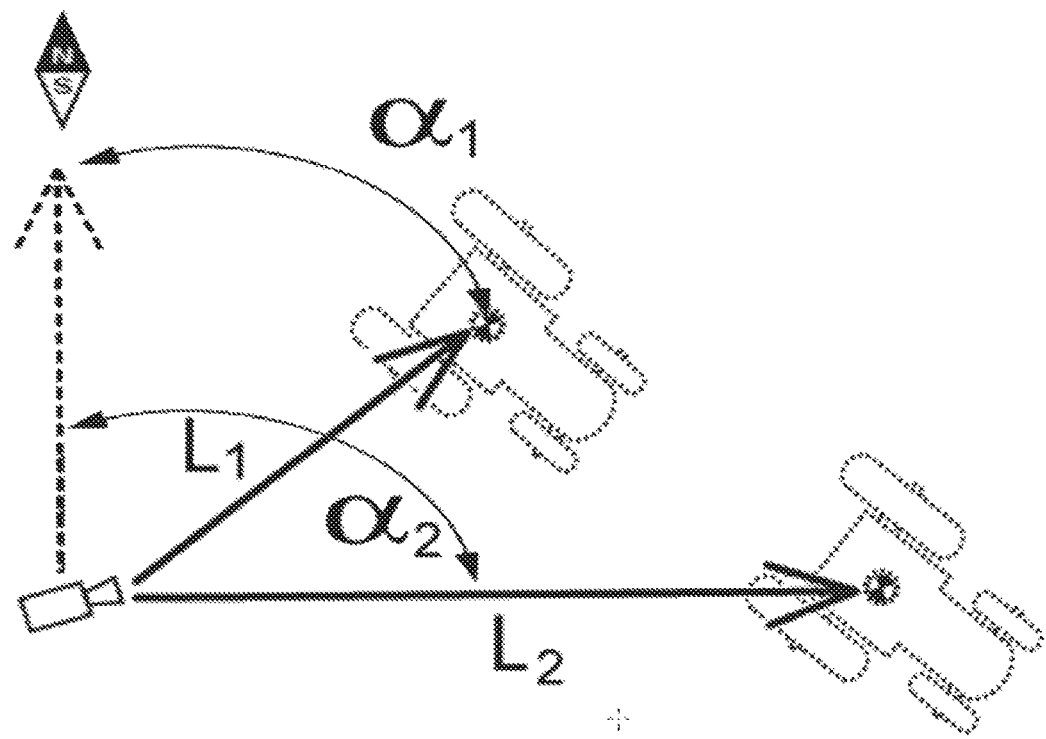
FIG. 4 shows a method of measuring distance (L) to the marker and angular offset ($\alpha$) to North of the marker by a measurement device located outside the vehicle and focused on the vehicle's marker.

FIG. 4 shows a method of measuring distance (L) to the marker and angular offset (α) to North of the marker by the corresponding measurement device located outside the vehicle and focused on the vehicle's marker. There are two positions of vehicle shown corresponding to 2 separate measurement sets: (L1, α1) and (L2, α2).

Figure 5:
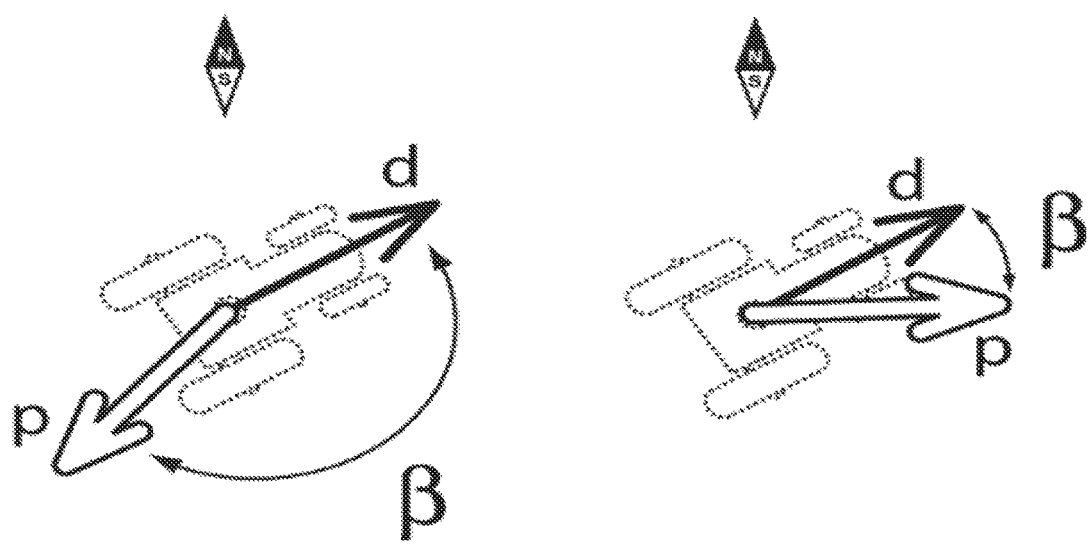
FIG. 5 shows a method of determining angle ($\beta$) between the vehicle movement azimuth vector (p)—taken from the movement vector measurement unit—and vehicle azimuth (d), taken from the compass mounted onto the vehicle.

FIG. 5 shows a method of determining angle (β) between the vehicle movement azimuth vector (p) taken from the movement vector measurement unit and vehicle azimuth (d) taken from the compass mounted onto the vehicle. There are two cases shown: when β>90 degrees on the left side which corresponds to direction backward and when β<90 degrees on the right side which corresponds direction forward.

Figure 6:
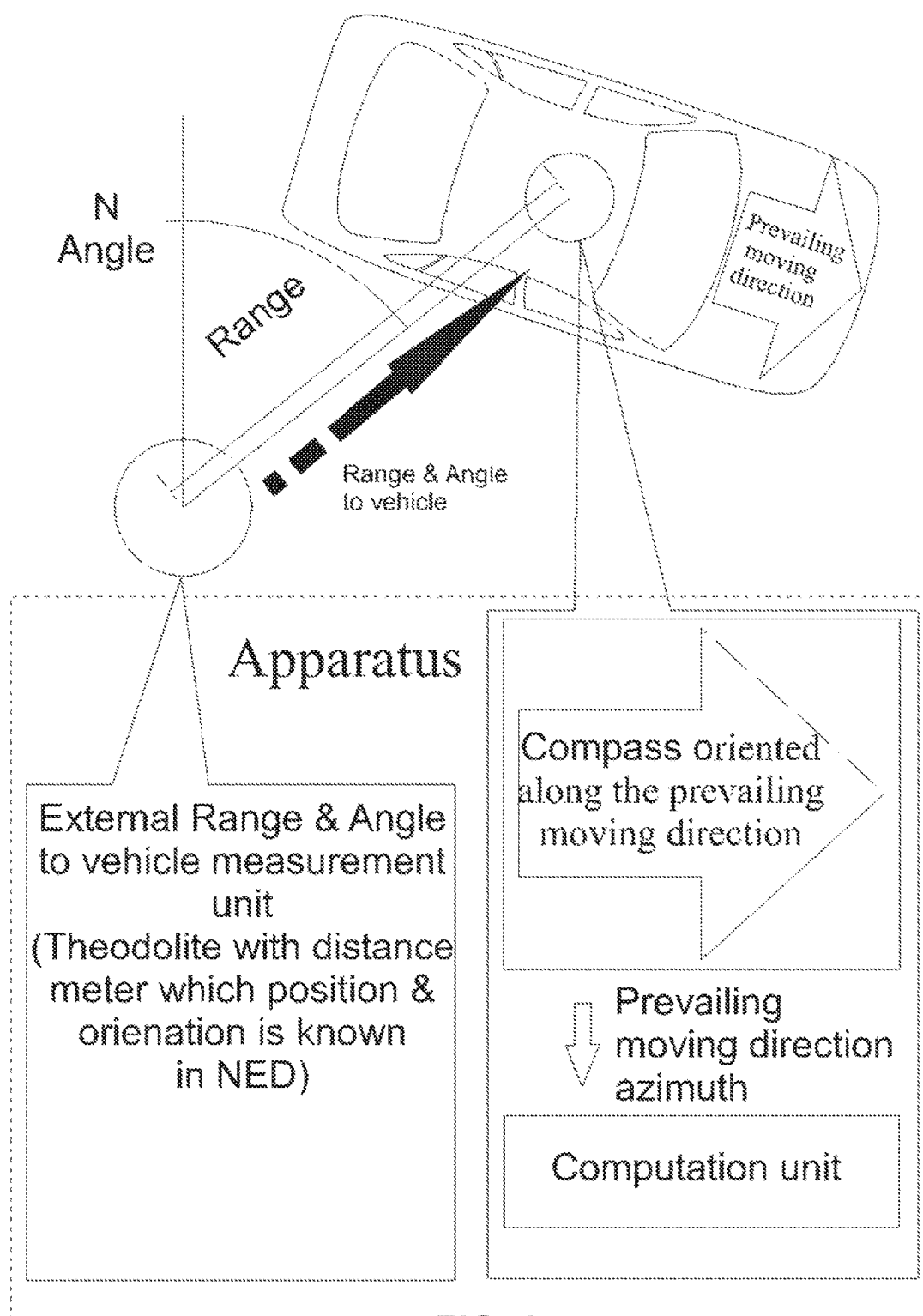
FIG. 6 shows an embodiment of the apparatus where a compass unit and a computation unit are mounted on vehicle (compass aligned to prevailing movement direction of the vehicle) and external (relative to the vehicle) check-point-to-vehicle-measuring unit (range sensor), and a marker angular position unit (angle meter).

FIG. 6 shows the apparatus embodiment where the compass unit and computation unit are mounted on vehicle (compass aligned to prevailing movement direction of the vehicle) and external (relative to the vehicle) check-point-to-vehicle-measuring unit (range sensor) and marker angular position unit (angle meter). External range and angle to vehicle measurement unit can be, for example, a theodolite with distance meter, assuming theodolite position and orientation are known in NED (thus its measurements will be related to known position and orientation). A set of measurements (distance and angle to North) is being passed to computation unit.

The compass can be a flux gate—a magnetically susceptible core wrapped by two or more coils of wire. Also, magnetic resistive film compass can be used (two or more layers permit calculating the compass direction—azimuth).

A computation unit receives measurements from a vehicle movement measurement unit and from a compass unit and them computation fulfills calculations described in algorithm below.

Figure 7:
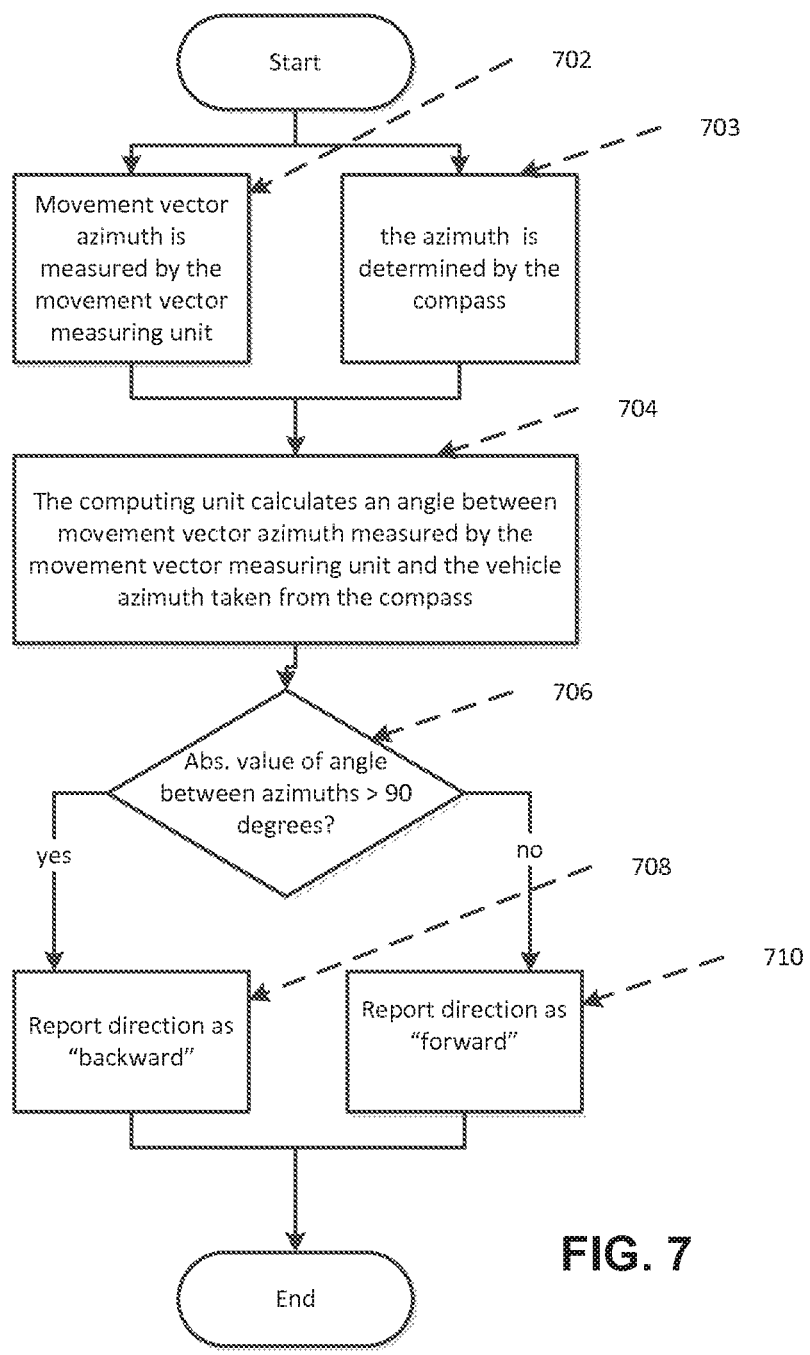
FIG. 7 shows a flow chart of the algorithm for movement direction determination.

The direction mode determination main algorithm is shown in FIG. 7:

1) Movement vector azimuth is measured by the movement vector measuring unit (step 702).

2) At the same time the azimuth is determined by the compass (step 703)

3) The computing unit calculates an angle (β) between movement vector (p) azimuth measured by the movement vector measuring unit and the vehicle prevailing moving direction (d) azimuth taken from the compass (step 704):

Angle (β) between azimuth=[180+("azimuth of movement vector (p)"−"vehicle prevailing moving direction (d) azimuth from compass")] (mod 360)−180, where addition of 180, taking modulo and subtraction back 180 helps to fit angle difference into the range from −180 to 180 degrees for further comparison.

4) The computing unit checks whether absolute value of angle (β) between azimuth is over 90 degrees? (step 706)

5) If absolute value of angle between azimuth is over 90 degrees, the computation unit reports determined direction mode as "backward" (step 708)

6) If absolute value of angle between azimuth is not over 90 degrees, the computation unit reports determined direction mode as "forward" (step 710).

Figure 10:
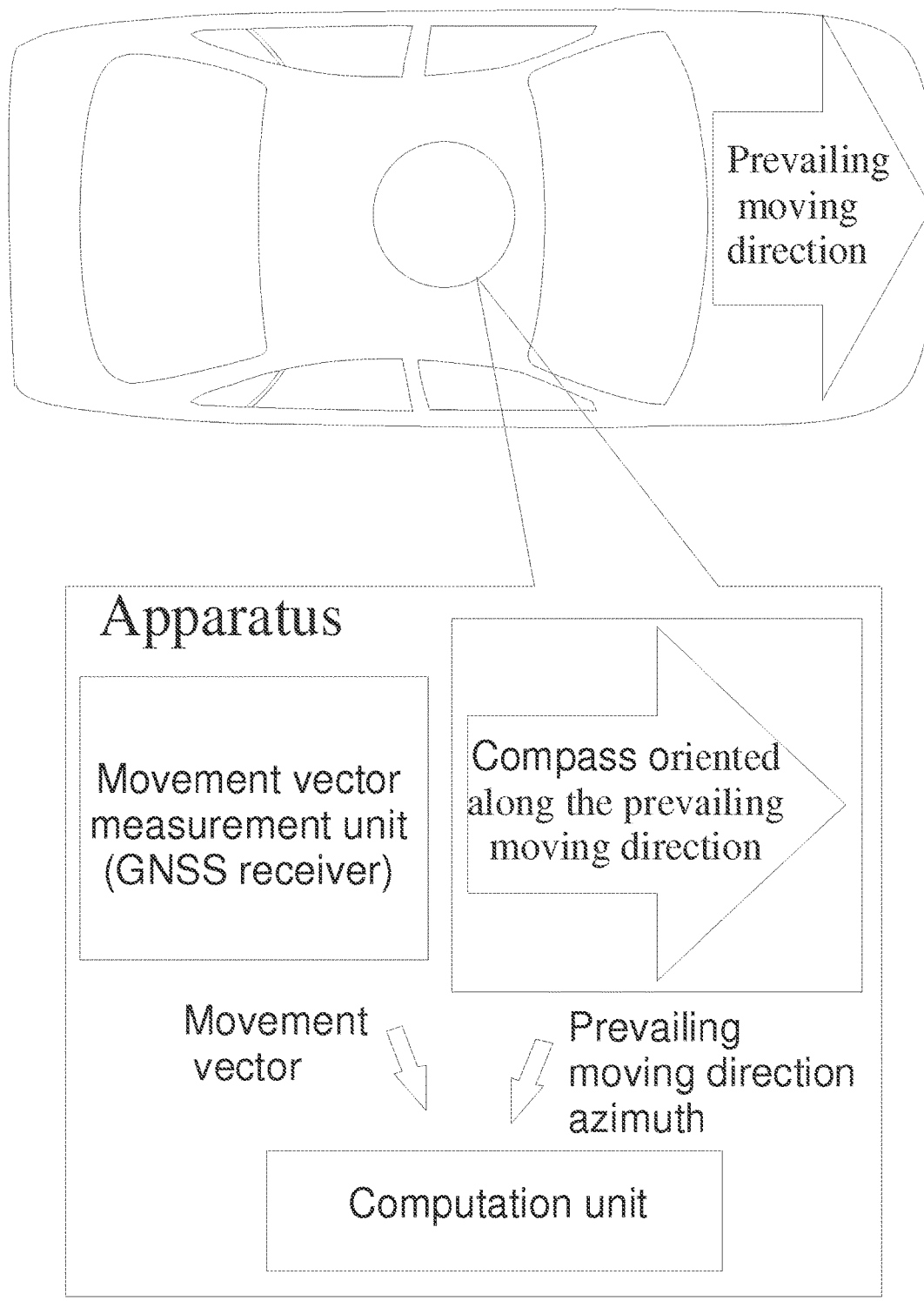
FIG. 10 shows the apparatus embodiment as apparatus where the movement vector measurement unit, compass unit and computation unit reside common enclosure.

The movement vector measurement unit can be a global navigation device (see 1 in FIG. 1) fixed onto a vehicle and connected through signal connection to the computation unit as shown in FIG. 10, the movement vector is determined by measuring, over a specific time interval, two sets of global coordinates, and by calculating movement vector azimuth in the computation unit within the local coordinate system. The interval can be about 10 hz for GNSS measurement, or about 5 hz for the laser optical system. IMUs or gyroscopes usually output their data at about 50-100 hz. The movement vector azimuth is calculated in a local coordinate system.

Figure 8:
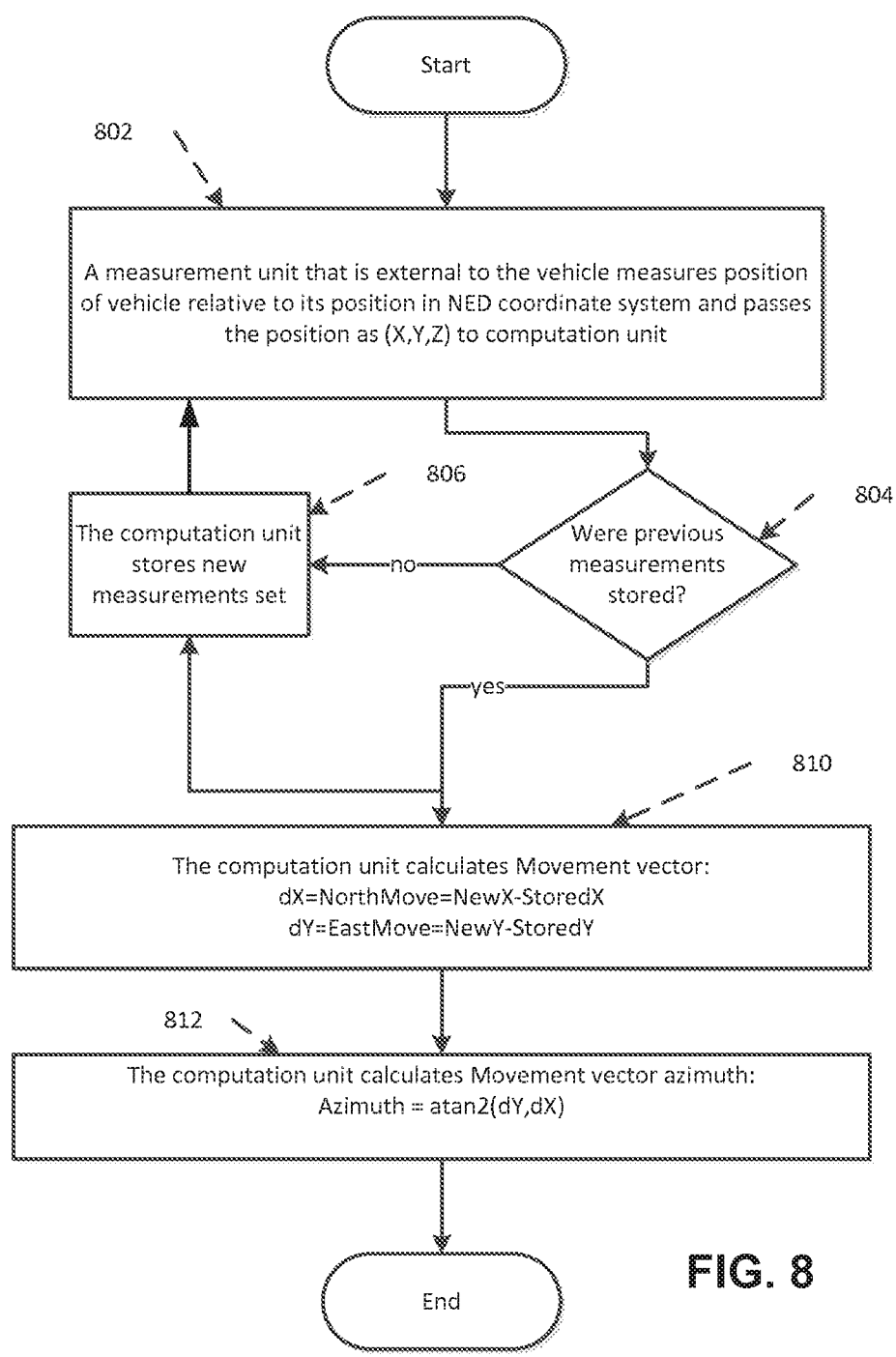
FIG. 8 shows a flowchart for alternate movement vector calculation for device comprising a set of external vehicle position measurements

The algorithm of calculating movement vector azimuth is shown in FIG. 8:

1) A measurement unit that is external to vehicle position measures position of vehicle relative to its position in NED coordinate system (step 802) and passes the position as (X, Y, Z) to calculating unit (step 804).

2) The calculating unit checks if the previous measurements were stored? (step 804)

3) If no go to step 806

4) If yes go to step 810 and step 806

5) The computation unit stores new measurements set (step 806) and returns to step 802

6) The computation unit calculates movement vector (step 810):

$$dX=\text{NorthMove}=\text{New}X-\text{Stored}X$$

$$dY=\text{EastMove}=\text{New}Y-\text{Stored}Y$$

7) The computation unit calculates movement vector azimuth (step 812):

$$\text{Azimuth}=\arctan 2(dY, dX)$$

Figure 9:
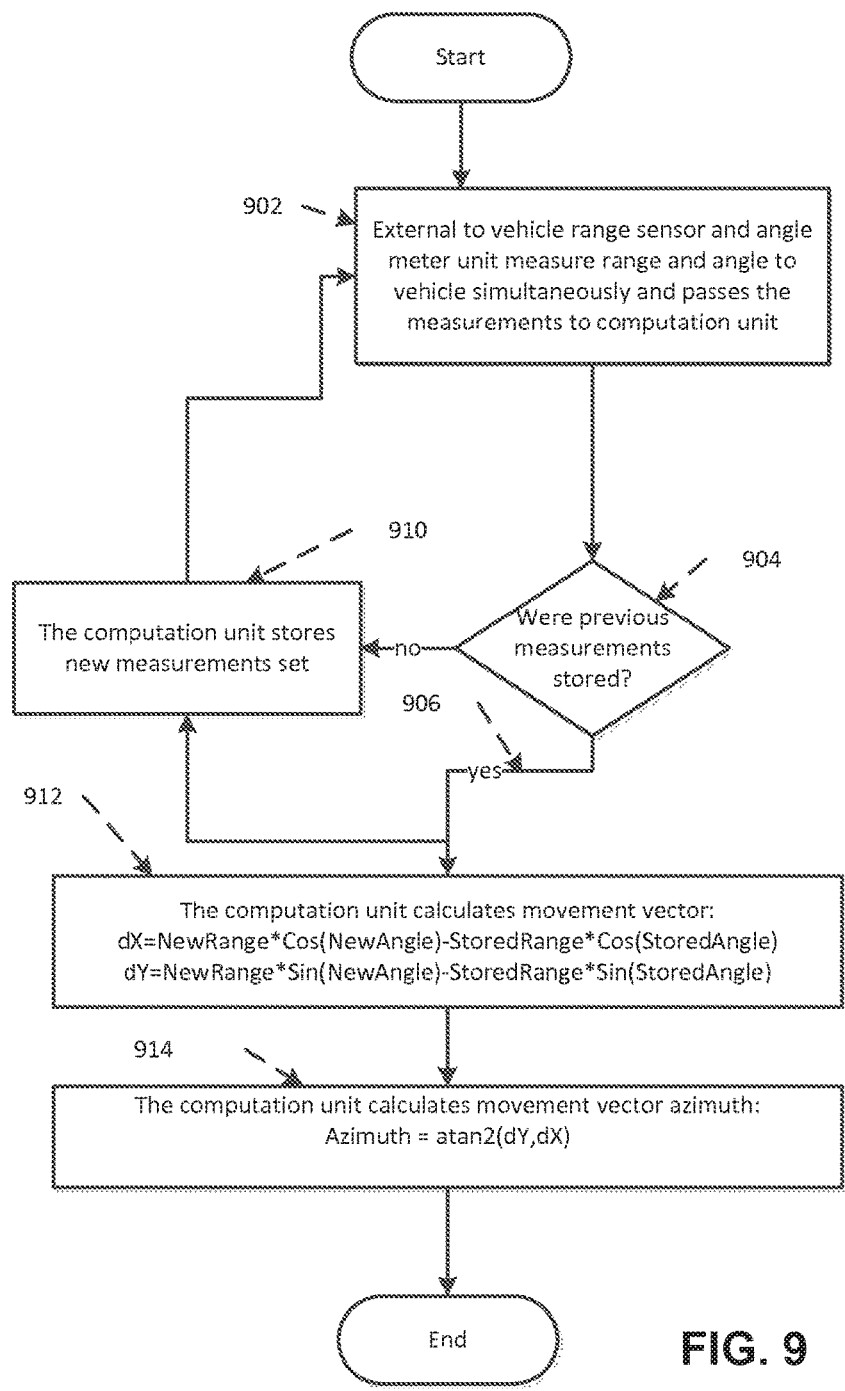
FIG. 9 shows a flowchart for alternate movement vector calculation for a device that performs a set of external measurements of range to vehicle and angle to vehicle.

The movement vector measurement unit can be in the form of device combining a range finder measuring the distance to the marker (as shown in FIG. 6, a range sensor) and an angle meter measuring angular position of the marker illustrated in FIG. 2 or FIG. 4 (for example, using a potentiometer or an encoder). Sensors are typically external relative to the vehicle. A special marker is assigned at the vehicle, which is further used for measurements. Examples of such a marker can be a reflective prism, a specially patterned colored area that can be recognized as a marker by a video processing system, etc. The measurement device and vehicle should be mutually arranged such that the marker will be accessible for measurements (in a visibility area). Then, at a particular time interval, two sets of ranges to the marker and marker angular offset are determined, according to which the azimuth of the movement vector is calculated by the computation unit. The algorithm of calculating movement vector azimuth is shown in FIG. 9:

1) Vehicle range sensor, which is external to the vehicle, and an angle meter unit (step 902) measure range and angle to vehicle simultaneously and passes the measurements to calculating unit (step 904)

2) The calculating unit checks: were previous measurements stored or not? (step 904)

3) If no, go to step 910

4) If yes, go to step 912 and step 910 (see link 906)

5) The computation unit stores new measurements set (step 910) and goes to step 902

6) The computation unit calculates movement vector (step 912):

$$dX = NewRange*Cos(NewAngle) - StoredRange*Cos(StoredAngle)$$

$$dY = NewRange*Sin(NewAngle) - StoredRange*Sin(StoredAngle)$$

7) The computation unit (step 914) calculates movement vector azimuth:

$$Azimuth = \arctan 2(dY, dX)$$

In addition, to enhance measurement accuracy, the marker (see 4 in FIG. 2) can be assigned by fixing a special prism onto the vehicle, which is used for performing all measurements and focusing the measurement unit.

The proposed method and apparatus enable to avoid known drawbacks in the prior art, and have low sensitivity to measurement errors and interference.

Having thus described a preferred embodiment, it should be apparent to those skilled in the art that certain advantages of the described method and apparatus have been achieved.

It should also be appreciated that various modifications, adaptations and alternative embodiments thereof may be made within the scope and spirit of the present invention. The invention is further defined by the following claims.

What is claimed is:

1. A method for determining whether a moving vehicle is moving in a forward movement mode or in a backward movement mode, the method comprising the steps of:
   measuring a magnetic azimuthal angle of the moving vehicle using a magnetic sensor mounted on the moving vehicle;
   measuring a vehicle movement vector associated with the moving vehicle using a GNSS receiver mounted on the moving vehicle, wherein measuring the vehicle movement vector further comprises:
      measuring by the GNSS receiver (i) a first vehicle position at a first time, and (ii) a second vehicle position at a second time; and
      determining the vehicle movement vector as a function of at least the first vehicle position and the second vehicle position;
   computing, with a computation unit, a movement vector azimuthal angle of the moving vehicle using the vehicle movement vector; and
   determining, with the computation unit, whether the moving vehicle is moving in the forward movement mode or in the backward movement mode based at least in part on the magnetic azimuthal angle and the movement vector azimuthal angle, by:
      calculating an angle based on a difference between the magnetic azimuthal angle and the movement vector azimuthal angle;
      computing an absolute value of the angle;
      comparing the absolute value to 90 degrees;
      upon determining that the absolute value is greater than 90 degrees, determining that the moving vehicle is moving in the backward movement mode; and
      upon determining that the absolute value is not greater than 90 degrees, determining that the moving vehicle is moving in the forward movement mode.

2. The method of claim 1, wherein the magnetic sensor is a compass.

3. The method of claim 2, wherein the magnetic azimuthal angle is referenced to a North axis.

4. The method of claim 3, wherein the measuring of the vehicle movement vector further comprises:
   measuring a plurality of velocities associated with the moving vehicle; and
   determining the vehicle movement vector as a function of particular ones of the plurality of velocities.

5. The method of claim 3, wherein:
   the compass is oriented such that, when the moving vehicle is moving along the North axis in the forward movement mode, the magnetic azimuthal angle is zero.

6. The method of claim 5, further comprising:
   transmitting the magnetic azimuthal angle from the compass to the computation unit; and
   transmitting the vehicle movement vector from the GNSS receiver to the computation unit.

7. The method of claim 5, wherein the vehicle movement vector utilizes coordinates defined by a local geodetic coordinate system.

8. The method of claim 7, further comprising:
   reporting a direction of the moving vehicle in the local geodetic coordinate system based upon determining whether the absolute value is less than or greater than 90 degrees.

9. An apparatus for determining whether a moving vehicle is moving in a forward movement mode or in a backward movement mode, the apparatus comprising:
   a magnetic sensor mountable on the moving vehicle and configured for measuring a magnetic sensor azimuthal angle of the moving vehicle;
   a GNSS receiver mountable on the moving vehicle and configured for measuring a vehicle movement vector associated with the moving vehicle:
   a computation unit configured to:
      receive, from the magnetic sensor, the magnetic azimuthal angle;
      receive, from the GNSS receiver, the vehicle movement vector, wherein the vehicle movement vector is based on (i) a first vehicle position measured from the GNSS receiver at a first time, and (ii) a second vehicle position measured from the GNSS receiver at a second time;
      compute a movement vector azimuthal angle of the moving vehicle using the vehicle movement vector; and
      determine whether the moving vehicle is moving in the forward movement mode or in the backward movement mode based at least in part on the magnetic azimuthal angle and the movement vector azimuthal angle by
         computing an angle based at least in part on a difference between the magnetic azimuthal angle and the movement vector azimuthal angle;
         computing an absolute value of the angle;
         comparing the absolute value to 90 degrees;

upon determining that the absolute value is greater than 90 degrees, determining that the moving vehicle is moving in the backward movement mode; and upon determining that the absolute value is not greater than 90 degrees, determining that the moving vehicle is moving in the forward movement mode.

10. The apparatus of claim 9, wherein the magnetic sensor is a compass.

11. The apparatus of claim 10, wherein the magnetic azimuthal angle is referenced to a North axis.

12. The apparatus of claim 11, wherein the measuring of the vehicle movement vector further comprises:

measuring a plurality of velocities associated with the moving vehicle; and determining the vehicle movement vector as a function of particular ones of the plurality of velocities.

13. The apparatus of claim 11, wherein:

the compass is oriented such that, when the moving vehicle is moving along the North axis in the forward movement mode, the compass azimuthal angle is zero.

14. The apparatus of claim 13, wherein the compass is configured for transmitting the magnetic azimuthal angle from the compass to the computation unit, and the GNSS receiver is configured for transmitting the vehicle movement vector from the GNSS receiver to the computation unit.

15. The apparatus of claim 13, wherein the vehicle movement vector utilizes coordinates defined by a local geodetic coordinate system.

16. The apparatus of claim 15, wherein the computation unit is further configured to:

report a direction of the moving vehicle in the local geodetic coordinate system based upon determining whether the absolute value is less than or greater than 90 degrees.

17. A vehicle capable of moving in a forward movement mode or in a backward movement mode, the vehicle comprising:

a magnetic sensor mounted on the moving vehicle and configured for measuring a magnetic sensor azimuthal angle of the moving vehicle;

a GNSS receiver mounted on the moving vehicle and configured for measuring a vehicle movement vector associated with the moving vehicle;

a computation unit configured to:

receive, from the magnetic sensor, the magnetic azimuthal angle;

receive, from the GNSS receiver, the vehicle movement vector, wherein the vehicle movement vector is based on (i) a first vehicle position measured from the GNSS receiver at a first time, and (ii) a second vehicle position measured from the GNSS receiver at a second time;

compute a movement vector azimuthal angle of the moving vehicle using the vehicle movement vector; and determine whether the moving vehicle is moving in the forward movement mode or in the backward movement mode based at least in part on the magnetic azimuthal angle and the movement vector azimuthal angle by computing an angle based at least in part on a difference between the magnetic azimuthal angle and the movement vector azimuthal angle;

computing an absolute value of the angle;

comparing the absolute value to 90 degrees;

upon determining that the absolute value is greater than 90 degrees, determining that the moving vehicle is moving in the backward movement mode; and upon determining that the absolute value is not greater than 90 degrees, determining that the moving vehicle is moving in the forward movement mode.

18. The vehicle of claim 17, wherein the magnetic sensor is a compass.

19. The vehicle of claim 18, wherein the magnetic azimuthal angle is referenced to a North axis.

20. The vehicle of claim 19, wherein the measuring of the vehicle movement vector further comprises:

measuring a plurality of velocities associated with the moving vehicle; and determining the vehicle movement vector as a function of particular ones of the plurality of velocities.

21. The vehicle of claim 19, wherein:

the compass is oriented such that, when the moving vehicle is moving along the North axis in the forward movement mode, the compass azimuthal angle is zero.

* * * * *